(12) United States Patent
Malone et al.

(10) Patent No.: US 9,560,393 B2
(45) Date of Patent: Jan. 31, 2017

(54) MEDIA PROCESSING NODE

(71) Applicant: Disney Enterprises, Inc., Burbank, CA (US)

(72) Inventors: James A. Malone, Burbank, CA (US); Lawrence Anthony, Malibu, CA (US); Philip Richards, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/627,528

(22) Filed: Feb. 20, 2015

(65) Prior Publication Data

US 2016/0249079 A1    Aug. 25, 2016

(51) Int. Cl.
*H04N 7/173* (2011.01)
*H04N 21/2343* (2011.01)
*G06F 9/455* (2006.01)

(52) U.S. Cl.
CPC .. *H04N 21/234309* (2013.01); *G06F 9/45558* (2013.01); *G06F 2009/45562* (2013.01)

(58) Field of Classification Search
CPC . H04N 7/17318; H04N 21/235; H04N 21/435
USPC ...... 725/91–93, 114–116; 709/219, 231, 232
See application file for complete search history.

(56) References Cited

U.S. PATENT DOCUMENTS

| | | | | |
|---|---|---|---|---|
| 6,542,546 B1* | 4/2003 | Vetro | ...................... | H04L 29/06 375/240.12 |
| 6,892,226 B1* | 5/2005 | Tso | .................... | G06Q 30/0207 709/218 |
| 8,270,487 B1* | 9/2012 | Kizhepat | ................ | H04N 19/48 375/240.12 |
| 8,321,906 B2* | 11/2012 | Ansari | ............... | H04N 21/4126 725/140 |
| 8,695,048 B1* | 4/2014 | Kellicker | ......... | H04N 21/47202 348/468 |
| 8,701,113 B2* | 4/2014 | Hildebrand | ....... | G06F 17/30197 718/102 |
| 8,731,374 B2* | 5/2014 | Mullins | ................ | G11B 27/034 386/284 |
| 8,908,632 B2* | 12/2014 | Pi | .......................... | H03M 13/27 370/329 |
| 9,161,063 B2* | 10/2015 | Ghosh | ............ | H04N 21/234309 |
| 9,204,204 B2* | 12/2015 | White | ................ | H04N 21/4432 |
| 9,232,274 B2* | 1/2016 | Meuninck | .......... | H04N 21/4334 |
| 9,405,571 B2* | 8/2016 | Diab | ..................... | G06F 9/5077 |

(Continued)

*Primary Examiner* — Annan Shang
(74) *Attorney, Agent, or Firm* — Patterson + Sheridan LLP

(57) ABSTRACT

Systems, methods and articles of manufacture for transcoding media content. Embodiments include receiving a request to perform a transcoding operation on a first instance of media content. The transcoding operation is divided into a plurality of sub-operations. Embodiments select one of a plurality of transcoding profiles for use in performing the transcoding operation. Additionally, embodiments configure a plurality of virtual machine instances to perform the plurality of sub-operations, based on configuration information specified within the selected transcoding profile. Execution of the plurality of sub-operations is initiated using the configured plurality of virtual machine instances to produce a plurality of encoded fragments. Embodiments then combine the plurality of encoded fragments to produce an encoded instance of media content.

18 Claims, 9 Drawing Sheets

(56) References Cited

U.S. PATENT DOCUMENTS

| | | | | |
|---|---|---|---|---|
| 2003/0158913 | A1* | 8/2003 | Agnoli | H04L 29/06 709/219 |
| 2007/0201388 | A1* | 8/2007 | Shah | H04N 19/194 370/300 |
| 2007/0274340 | A1* | 11/2007 | Raveendran | H04N 19/137 370/468 |
| 2009/0322784 | A1* | 12/2009 | Sartori | H04N 21/426 345/619 |
| 2010/0123830 | A1* | 5/2010 | Vunic | G06K 9/00711 348/700 |
| 2010/0158913 | A1* | 6/2010 | Lawson | A61K 47/48215 424/135.1 |
| 2011/0040396 | A1* | 2/2011 | Kraemer | G10L 19/00 700/94 |
| 2011/0058793 | A1* | 3/2011 | Mullins | G11B 27/034 386/328 |
| 2011/0083049 | A1* | 4/2011 | Grube | G06F 11/1092 714/702 |
| 2013/0166580 | A1* | 6/2013 | Maharajh | H04L 65/605 707/758 |
| 2013/0318154 | A1* | 11/2013 | Jacobson | H04L 67/10 709/203 |
| 2015/0074201 | A1* | 3/2015 | Maria | H04L 51/10 709/206 |

* cited by examiner

MEDIA PROCESSING NODE

BACKGROUND

Field of the Invention

The present disclosure relates to transcoding media content, and more specifically, to techniques for extracting metadata from video content as part of a transcoding operation and using the extracted metadata to optimize the transcoding operation for the video content.

Description of the Related Art

A number of different techniques exist today for delivering video content to users. Generally speaking, existing systems for delivering video content, such as over-the-air broadcasts, cable television service, Internet television service, telephone network television service, satellite television service, satellite radio service, websites, etc., provide a relatively impersonalized, generic experience to all viewers. For example, with respect to broadcast television, all viewers of a given television network station receive essentially the same content in essentially the same order.

As the number of delivery mechanisms for delivering video content to users continues to grow, so does the need to encode the video content in various different formats and bit rates. For example, the encoding format for the video content used in broadcast television may differ from the encoding format used in high-quality media streaming. Moreover, in order to provide an improved media streaming environment, content servers may store the video content in multiple different encoding rates, so that an appropriate encoding rate can be selected for streaming to a particular client device. For instance, the content server could select an encoding with a relatively high encoding rate to transmit to a client device with a relatively high bandwidth network connection, and the content server could select an encoding with a relatively low encoding rate to transmit to another client device with a relatively low bandwidth network connection.

SUMMARY

Embodiments include a system, method and computer-readable medium for transcoding media content. The system, method and computer-readable medium include receiving a request to perform a transcoding operation on a first instance of media content. According to the system, method and computer-readable medium, the transcoding operation is divided into a plurality of sub-operations. The system, method and computer-readable medium further include selecting one of a plurality of transcoding profiles for use in performing the transcoding operation. Additionally, the system, method and computer-readable medium include configuring a plurality of virtual machine instances to perform the plurality of sub-operations, based on configuration information specified within the selected transcoding profile. According to the system, method and computer-readable medium, execution of the plurality of sub-operations is initiated using the configured plurality of virtual machine instances to produce a plurality of encoded fragments. The system, method and computer-readable medium also include combining the plurality of encoded fragments to produce an encoded instance of media content.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
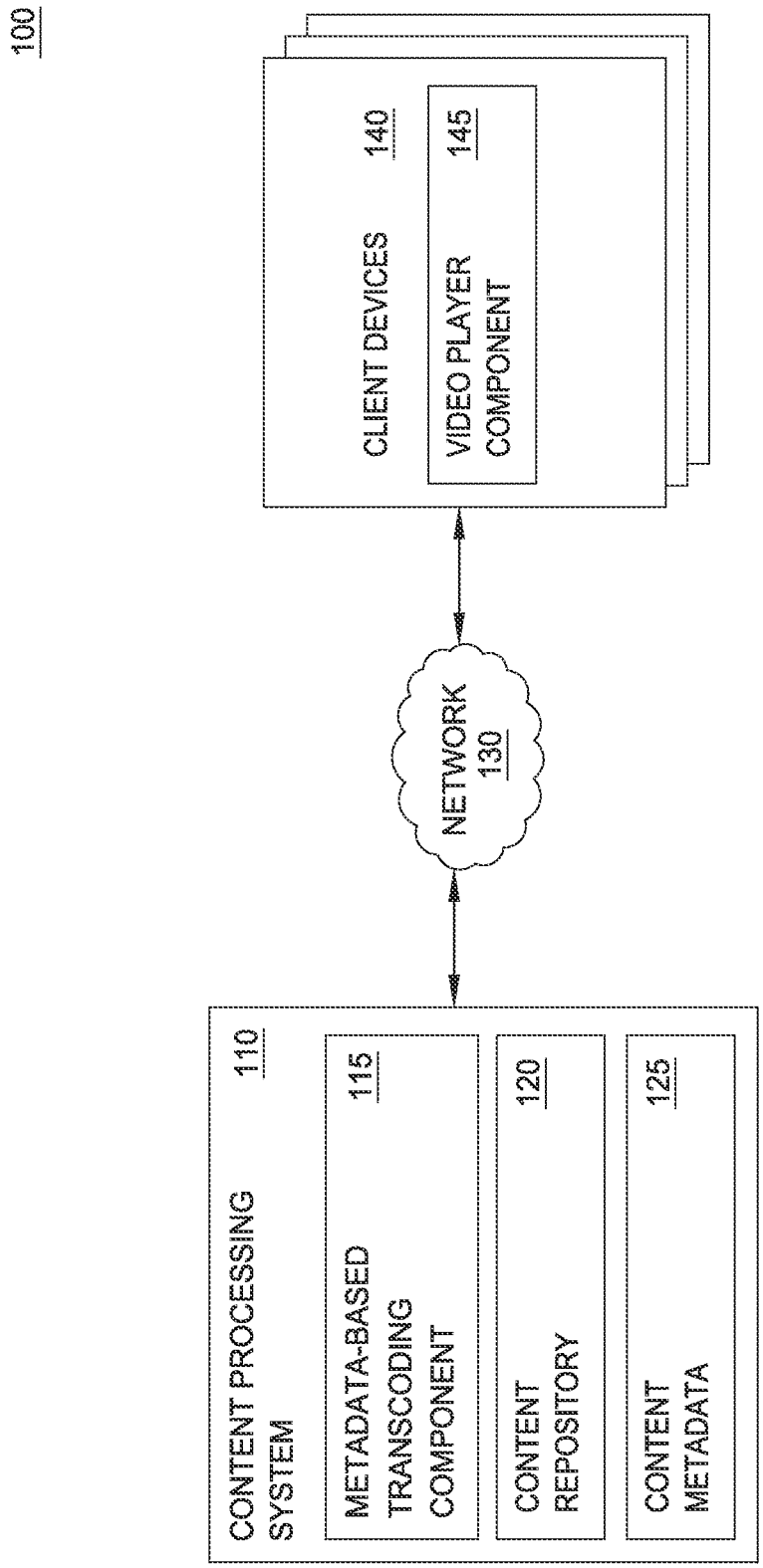
FIG. 1 is a block diagram illustrating a system including a content processing system configured with a metadata-based transcoding component, according to one embodiment described herein.

Generally, transcoding is the direct conversion of a video encoding from a first encoding format to another encoding format. Transcoding is a very common task in broadcasting infrastructures because the media format used in production is not necessarily the same format as the media format used to store the video content in an archive, while another format could be used to broadcast the video content to the audience, and still another format could be used for streaming the content across a communications network (e.g., the Internet). As such, multiple transcoding operations may be performed for a single instance of video content so that the instance of video content can be maintained in multiple different formats.

Efficient methods for transcoding video content are becoming increasingly important as the need for providing video content in a variety of different formats and encoding rates grows. That is, because each transcoding operation is a relatively expensive operation in terms of processing resources and multiple transcoding operations may need to be performed for a single instance of video content, a substantial number of transcoding operations may need to be performed for a content library containing multiple instances of video content. As such, it is desirable for the transcoding operations to be as efficient as possible and even small improvements in transcoding efficiency can result in a substantial cost savings in terms of both resources and time.

Another factor in addition to transcoding efficiency is the quality of the encoding produced by the transcoding operation. Generally, it is desirable to produce as high quality of an encoding as is possible within a given set of constraints. For instance, a particular encoding may be constrained to a particular file size to ensure that the encoding is suitable for its intended purposes. As an example, an encoding intended for streaming to client devices with a relatively low measure of network bandwidth may be constrained to a relatively small file size. As such, transcoding operations for producing such a video encoding may be optimized to maximize the quality of the video encoding while still preserving the desired file size.

When generating an optimized transcoding schedule for use in transcoding a particular instance of video content, it can be beneficial to consider metadata describing the video content. Generally, such metadata describes aspects of the instance of video content. For example, such metadata could describe measures of motion within frames of the video content at various sample points throughout the video content. Additionally, such metadata could specify areas within frames of the video content that are textual regions (i.e., areas within the frame that contain textual characters).

Such metadata can then be used to optimize the transcoding of the instance of video content. For example, frames with a higher measure of motion could be encoded at a higher encoding rate while frames with a lower measure of motion could be encoded at a lower encoding rate. Moreover, metadata specifying textual areas within particular frames of the video content could be used in allocating encoding bandwidth between frames of the video content. For instance, frames that include textual regions could be encoded at a higher encoding rate to help ensure the text remains legible. Additionally, some encoders may allow different regions within a single frame to be encoded at different encoding rates. In such an embodiment, the textual region within the frame could be encoded at a higher encoding rate while the remaining region of the frame could be encoded at a lower encoding rate, to help ensure the text remains legible when the encoded video content is viewed.

Descriptive metadata for video content is becoming increasingly important, particularly because such metadata can have additional uses outside of transcoding operations. For example, descriptive metadata can be used in provide search functionality across a library of video content. For example, a particular instance of video content having a textual region in a particular location of a substantial number of frames could be determined to be sports content (i.e., where the textual region corresponds to a scoreboard located in the particular location of the frames) and could be flagged as such in the content archive, such that the particular instance of video content is returned for searches corresponding to sports content. Such metadata can also be used for offering new types of services to consumers (e.g., identifying and providing related media content in addition to an instance of video content) and for licensing to third parties for their transcoding operations and other types of operations.

Descriptive metadata can be obtained through a number of different procedures, including manual, semi-automatic and fully automatic procedures. Automatic metadata extraction algorithms are typically complex algorithms which usually contain several intermediate media processing algorithms. As such, these metadata extraction algorithms are usually computational expensive operations to perform.

Accordingly, embodiments provide techniques for extracting and using descriptive metadata as part of a video transcoding operation. Embodiments receive an instance of video content for processing and determine a plurality of shots within the instance of video content. Generally, each shot includes a sequence of frames within the video content and every frame within the video content is included within one of the plurality of shots. Embodiments analyze the instance of video content to generate metadata describing the media content. Such metadata can include, for each of the plurality of shots, data describing a plurality of frames within the respective shot. Embodiments then determine an optimized transcoding schedule for transcoding the instance of video content from a first video encoding format to a second video encoding format, based on the generated metadata. Embodiments then transcode the instance of video content according to the optimized transcoding schedule. Doing so enables the transcoding and metadata extraction tasks to share the same computing infrastructure and further allows intermediate results of the metadata extraction algorithms to be reused in performing the transcoding operations. Moreover, embodiments can reduce preprocessing time of the video codecs used in the transcoding process and enable specific values of the video codecs to be automatically tuned using the extracted metadata, a task which would otherwise require time consuming and tedious manual adjustment.

FIG. 1 is a block diagram illustrating a system including a content processing system configured with a metadata-based transcoding component, according to one embodiment described herein. As shown, the system 100 includes a content processing system 110 and a plurality of client devices 140, interconnected via a network 130. The content processing system 110 includes a metadata-based transcoding component 115, a content repository 120 and content metadata 125. Of note, although the content processing system 110 is shown as a single entity in the system 100, such a depiction is for illustrative purposes only and it is generally contemplated that any number of compute nodes and other resources can be used to implement the content processing system 110.

Generally, the metadata-based transcoding component 115 is configured to perform transcoding operations for content items within the content repository 120. Furthermore, as part of such transcoding operations, the metadata-based transcoding component 115 is configured to extract the content metadata 125 from the content item for use in optimizing the transcoding operation. The metadata-based transcoding component 115 can also save such content metadata 125 for subsequent use with other, non-transcoding operations.

As part of such a transcoding operation, the metadata-based transcoding component 115 can receive an instance of video content for processing. For instance, the metadata-based transcoding component 115 could select one of the content items within the content repository 120 for processing. The metadata-based transcoding component 115 could then determine a plurality of shots within the instance of video content. Generally, each of the shots represents a sequence of frames within the selected instance of video content. For instance, each shot could be identified based on similarities between the frames in the sequence of frames for the shot. As an example, a sequence of frames for a particular shot could be selected based on the frames in the sequences of frames having a similar distribution of pixel coloration, a similar measure of brightness, and/or a similar measure of motion to one another. More generally, however, any number of different parameters and techniques can be used for determining the plurality of shots within the instance of video content.

The metadata-based transcoding component 115 can further analyze the instance of video content to generate the content metadata 125 describing the media content. Such metadata can include, for each of the plurality of shots, data describing a plurality of frames within the respective shot. For example, the metadata-based transcoding component 115 could analyze the frames within the instance of video content to determine which of the frames includes a textual area and, for each frame containing a textual area, a region within the frame where the textual area is located. As another example, the metadata-based transcoding component 115 could determine a measure of motion within each of the plurality of shots, and such motion information could be specified as part of the content metadata 125.

The metadata-based transcoding component 115 may then generate an optimized transcoding schedule for transcoding the instance of video content from a first video encoding format to a second video encoding format, based on the generated metadata. Generally, the transcoding schedule describes an optimized transcoding operation for the instance of video content. Such a schedule can include, for instance, a group of pictures (GOP) size, particular frames to use as reference frames within a GOP, a GOP pattern for use in transcoding the instance of video content, encoding bitrates for particular frames within the instance of video content, and so on.

The metadata-based transcoding component 115 can then transcode the instance of video content according to the optimized transcoding schedule. Moreover, the extracted metadata can be saved for use with subsequent, non-transcoding operations. By extracting the metadata as part of the transcoding operation, the metadata-based transcoding component 115 can operate more efficiently as certain computations performed as part of the metadata extraction process can be reused for the transcoding operation.

Figure 2:
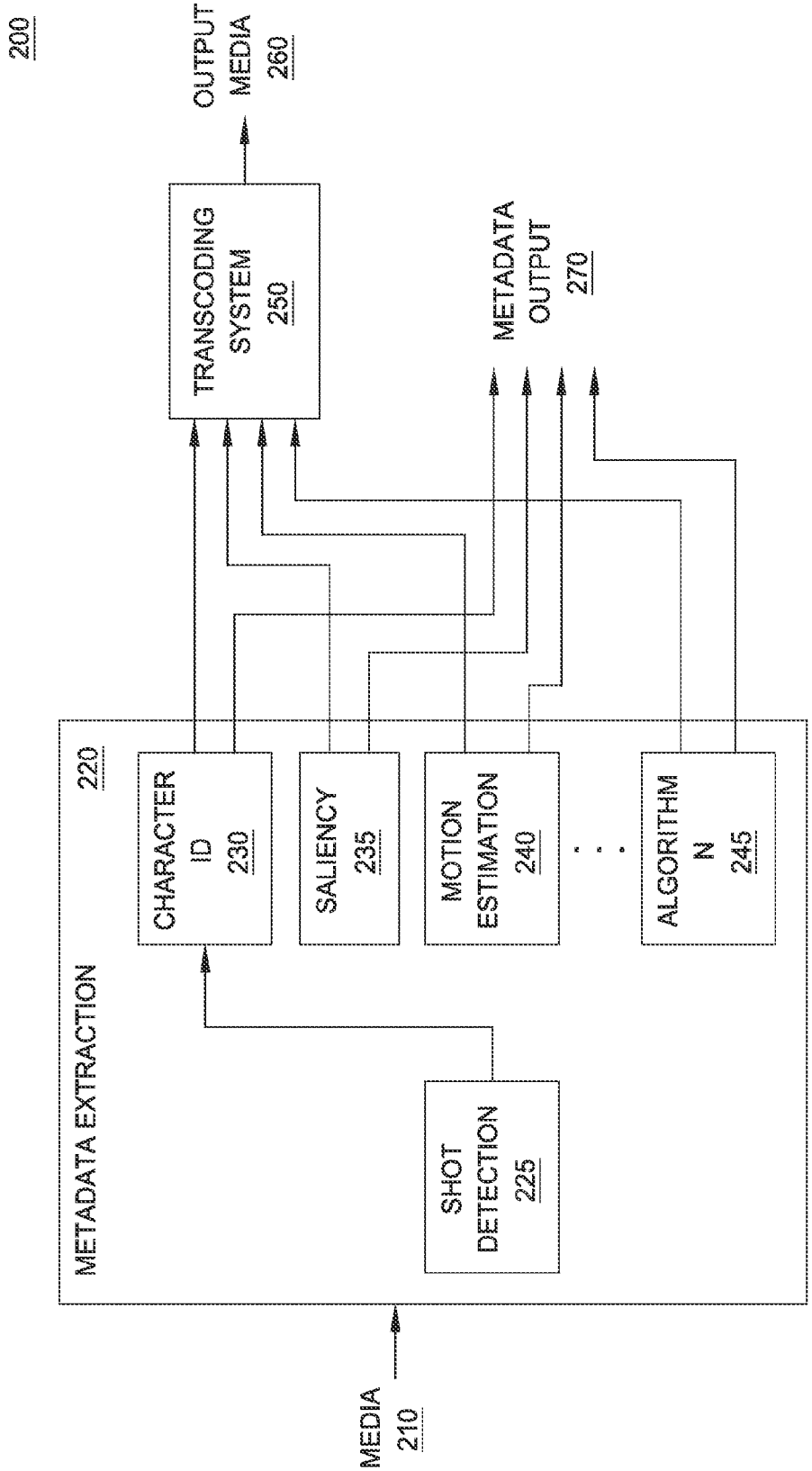
FIG. 2 is a block diagram illustrating a workflow for metadata-based transcoding, according to one embodiment described herein.

FIG. 2 is a block diagram illustrating a workflow for metadata-based transcoding, according to one embodiment described herein. As shown, the diagram 200 depicts an instance of media content 210 that is processed by the metadata-based transcoding component 115 as part of a metadata extraction operation 220. The metadata extraction operation 220 includes a shot detection block 225. Generally, in the shot detection block 225, the metadata-based transcoding component 115 analyzes the frames of the media content 210 to determine a plurality of different shots present within the media content 210. As discussed above, each shot includes a unique sequence of frames within the media content 210 and the various shots can be identified based on similarities between the frames in the respective sequence of frames for the shot.

Once the plurality of shots is identified in the shot detection block 225, the metadata-based transcoding component 115 performs N different metadata extraction algorithms on the plurality of shots within the video content 210. In the diagram 200, such algorithms include a character identification algorithm 230, a saliency determination algorithm 235, a motion estimation algorithm 240, and so on up to an algorithm N 245. Of course, the depiction of the particular algorithms 230, 235, 240 and 245 is provided for illustrative purposes only and without limitation and, more generally, the metadata-based transcoding component 115 can perform any metadata extraction algorithms on the media content 210, consistent with the present disclosure.

Returning to the diagram 200, the results of the algorithms 230, 235, 240 and 245 are sent to both the transcoding system 250 and a metadata output operation 270. As part of the metadata output operation 270, the metadata-based transcoding component 115 saves the extracted metadata for use in subsequent operations. For example, such subsequent operations could include search functionality related to the media content 210 (e.g., descriptive parameters associated with the media content 210 that can be used to identify the media c content 210 as part of a search operation). More generally, any subsequent operations capable of using such metadata can be used.

Additionally, the diagram 200 depicts the extracted metadata being sent to the transcoding system 250, where the media item 210 is transcoded to produce an output media file 260. Here, the metadata-based transcoding component 115 uses the extracted metadata to optimize the transcoding operations for the media item 210.

Such transcoding optimizations are also referred to herein as a transcoding schedule for the instance of media content 210. For example, the metadata-based transcoding component 115 could use the computed measures of motion within the frames of the media item 210 to determine an encoding bitrate at which to encode the various frames within the media item 210. For example, the metadata-based transcoding component 115 can select a relatively higher bitrate for a sequence of frames having a higher measure of motion and can select a relatively lower bitrate for another sequence of frames having a lower measure of motion.

As another example, the metadata-based transcoding component 115 could determine a measure of motion compensation within the frames of a particular shot. Generally, motion compensation is an algorithmic technique employed in video data encoding to describe a picture in terms of the transformation of a reference picture to a current picture. Such a shift to a first picture to represent another picture is represented by a motion vector. In determining an optimal transcoding schedule for the media item 210, the metadata-based transcoding component 115 could use the motion estimation information to specify a motion search range for a particular shot within the media item 210. Generally, the motion search range specifies the size of an area the video codec will search for an element of a frame that may have moved from a previous frame (e.g., measured as a number of frames to search). For instance, the metadata-based transcoding component 115 could determine that a shot having a higher measure of motion should have a relatively larger motion search range, and could determine that another shot having a lower measure of motion should have a relatively smaller motion search range.

In one embodiment, the metadata-based transcoding component 115 is configured to reuse totally/partially motion estimation vectors resulting from algorithm 240 for the motion compensation task in the encoder used to perform the transcoding operations on transcoding system 250. In various embodiments, the metadata-based transcoding component 115 may be configured to partially re-use the motion estimation vectors, such that the encoder is still required to compute some additional motion estimation vectors as part of the encoding process. In certain embodiments, however, the encoder can completely re-use the motion estimation vectors computed by the algorithm 240 without having to compute any additional motion estimation vectors. Doing so adds to the efficiency of the encoding process by allowing the encoder to re-use the results of already completed calculations.

Additionally, the metadata-based transcoding component 115 could use the extracted metadata to optimize GOP-related parameters during the transcoding process. Generally, to achieve inter frame compression, some video codecs organized compressed frames into groups. Such groups may contain reference frames (i.e., frames that have all the necessary data to re-create a complete image for the frame) and predicted frames (i.e., frame having less than all of the necessary data to re-create a complete image for the frame, and instead are encoded based on a reference frame).

Generally, the metadata-based transcoding component 115 can define a GOP by a length and a pattern of reference frames and predicted frames. For instance, a longer GOP length and an increased usage of predicted frames can produce a more efficient video encoding, but may be undesirable in certain situations. As an example, the metadata-based transcoding component 115 could determine that a particular shot within the media item 210 contains a high amount of motion and thus could determine that a shorter GOP length and more reference frames should be used to encode the particular shot, thereby producing a higher quality encoding of the shot. As another example, the metadata-based transcoding component 115 could determine that another shot contains relatively little motion and thus a longer GOP length and an increased number of predicted frames can be used in encoding the shot, thereby producing a more efficient encoding.

As still another example, the metadata-based transcoding component 115 could determine that another sequence of frames within the media item 210 contains many shot changes but each of the shots contains a relatively low measure of motion. An example of such a media item could be, for instance, a news broadcast, where the shots switch from one reporter to the next, but the frames within each shot contain relatively little motion. As such, the metadata-based transcoding component 115 could determine that the frames should be encoded with a shorter GOP length due to the high number of scene changes within the frames, but can be encoded with a relatively low bitrate to produce a more efficient encoding due to the low measures of motion within each of the shots.

The metadata-based transcoding component 115 can also be configured to use the saliency metadata in generating the optimized transcoding schedule for the media item 210. For example, the metadata-based transcoding component 115 could perform a region-of-interest based encoding on the media item 210, where different quantization parameters are applied to individual regions within frames (e.g., regions of less interest, regions of more interest, etc.). As part of such a region-of-interest based encoding, the metadata-based transcoding component 115 could use the saliency algorithm 235 to estimate regions of interest within the frames of the media item 210. For example, the metadata-based transcoding component 115 could use the results of the saliency algorithm 235 as a mask to specify salient or regions of interest with frames of the media item 210, prior to encoding the media item 210 using a region-of-interest encoding algorithm. Doing so can produce a higher quality encoding, as the specified regions of high interest can be encoded with a higher quality encoding than the regions of low interest.

In one embodiment, the metadata-based transcoding component 115 is configured to employ a text detection algorithm in generating the metadata describing the media item 210. For instance, the metadata-based transcoding component 115 could detect textual regions within frames of the media item 210 and could then manipulate the textual regions within the frames to improve the readability of the text. Additionally, the metadata-based transcoding component 115 could employ one or more optical character recognition (OCR) algorithms to determine the text appearing within the frames of the video content, and such text could be reflected in the extracted metadata.

Generally, it is desirable to for text within the media item 210 to remain readable in the output media 260. However, certain video encodings (e.g., a low bitrate encoding) may impair the readability of the text within certain frames of the video. Such text illegibility may be acceptable for certain video content, but may be unacceptable for other types of video content (e.g., the text representing the score in a sporting event, weather information within a weather forecast program, etc.). As such, in one embodiment, the metadata-based transcoding component 115 could perform a region-of-interest encoding of the media item 210, where the identified textual regions are specified as regions of interest within the media item. For example, the metadata-based transcoding component 115 could perform the encoding such that the textual region within a frame is encoded at a higher bitrate than a non-textual region within the frame.

In one embodiment, the metadata-based transcoding component 115 is configured to perform a second OCR algorithm for the output media 260 to determine an amount of text within the output media 260. The metadata-based transcoding component 115 could then compare the amount of text within the output media 260 with a determined amount of text within the input media item 210, to determine whether the text of the media item 210 is still readable in the output media 260. That is, if the metadata-based transcoding component 115 determines that the OCR algorithm detected less text in the output media 260 than in the input media item 210, the metadata-based transcoding component 115 could determine that some of the text within the media item 210 was rendered illegible by the encoding operation (e.g., due to blurriness of the text or a size of the text after transcoding).

Upon determining that the output media 260 contains less text than the input media 210, the metadata-based transcoding component 115 could begin an iterative process in which the transcoding schedule for the media item 210 is refined and the media item 210 is again encoded into the output media 260. The metadata-based transcoding component 115 could then perform an additional comparison of the detected text within the output media 260 and the initial media item 210 to determine whether the refined transcoding schedule improved or impaired the readability of the text. The metadata-based transcoding component 115 could continue to iterate through this process of refining the transcoding schedule and encoding the media item 210 until an acceptable level of text readability is achieved (e.g., the output media 260 contains at least a threshold percentage of the text included in the input media 210).

Figure 3:
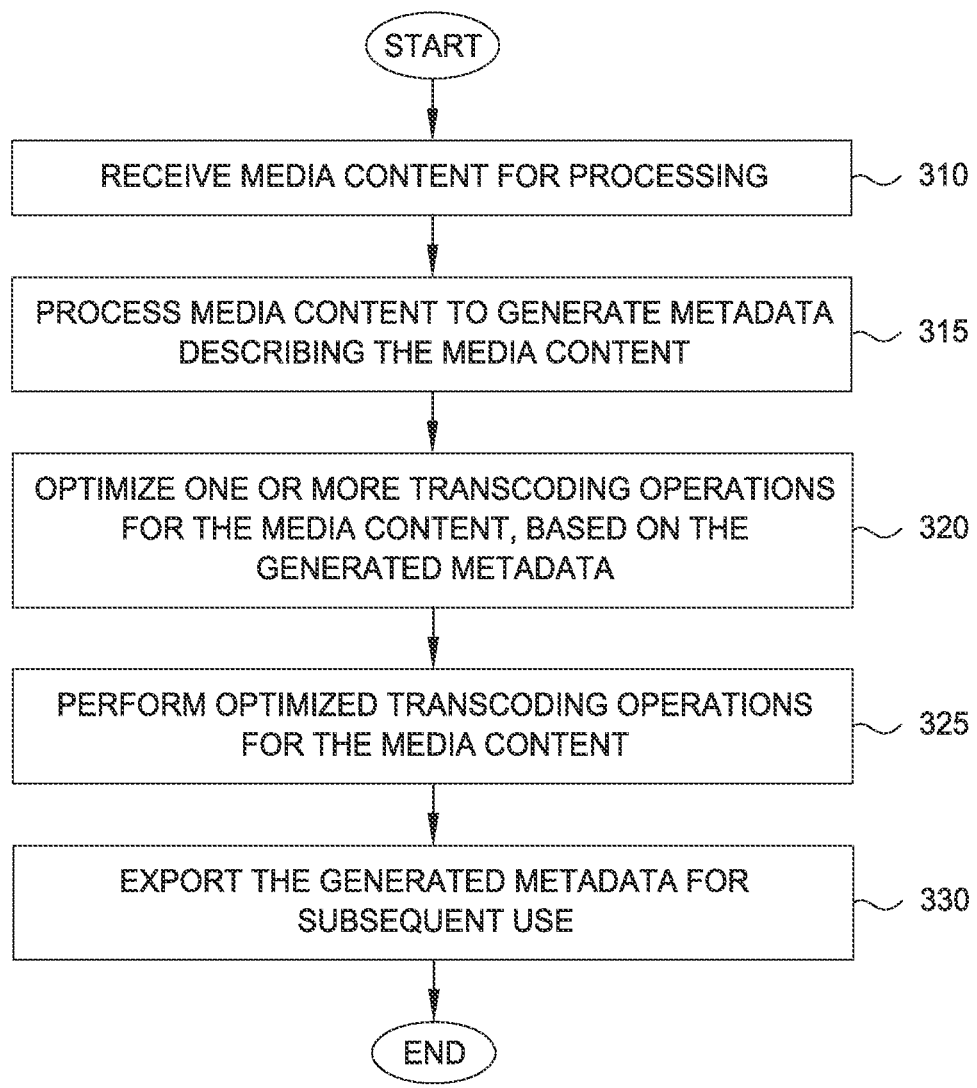
FIG. 3 is a flow diagram illustrating a method for performing metadata-based transcoding for an instance of video content, according to one embodiment described herein.

FIG. 3 is a flow diagram illustrating a method for performing metadata-based transcoding for an instance of video content, according to one embodiment described herein. As shown, the method 300 begins at block 300, where the metadata-based transcoding component 115 receives an instance of media content for processing. The metadata-based transcoding component 115 then processes the instance of media content to generate metadata describing the media content (block 315). As discussed above, such processing can include motion estimation algorithms, saliency determination algorithms, text detection algorithms, and so on.

The metadata-based transcoding component 115 then generates an optimized transcoding schedule for the instance of media content based on the generated metadata (block 320). For example, the transcoding schedule could specify bit rates at which particular shots of the media content are to be encoded, GOP length and/or pattern for encoding shots of the media content, particular regions-of-interest within the video content to be encoded at a relatively higher bitrate, and so on. More generally, the transcoding schedule can include any video encoding optimizations capable of being made based on metadata descriptive of the video content being encoded.

The metadata-based transcoding component 115 then performs an encoding operation for the instance of media content according to the optimized transcoding schedule (block 325). Additionally, the metadata-based transcoding component 115 in the depicted method 300 exports the extracted metadata for subsequent usage (block 330) and the method 300 ends. Advantageously, by extracting the metadata as part of a transcoding operation, the metadata-based transcoding component 115 is able to share particular calculations made during the metadata extraction process with the encoding process, thereby avoiding performing duplicate operations in each of these processes.

Figure 4:
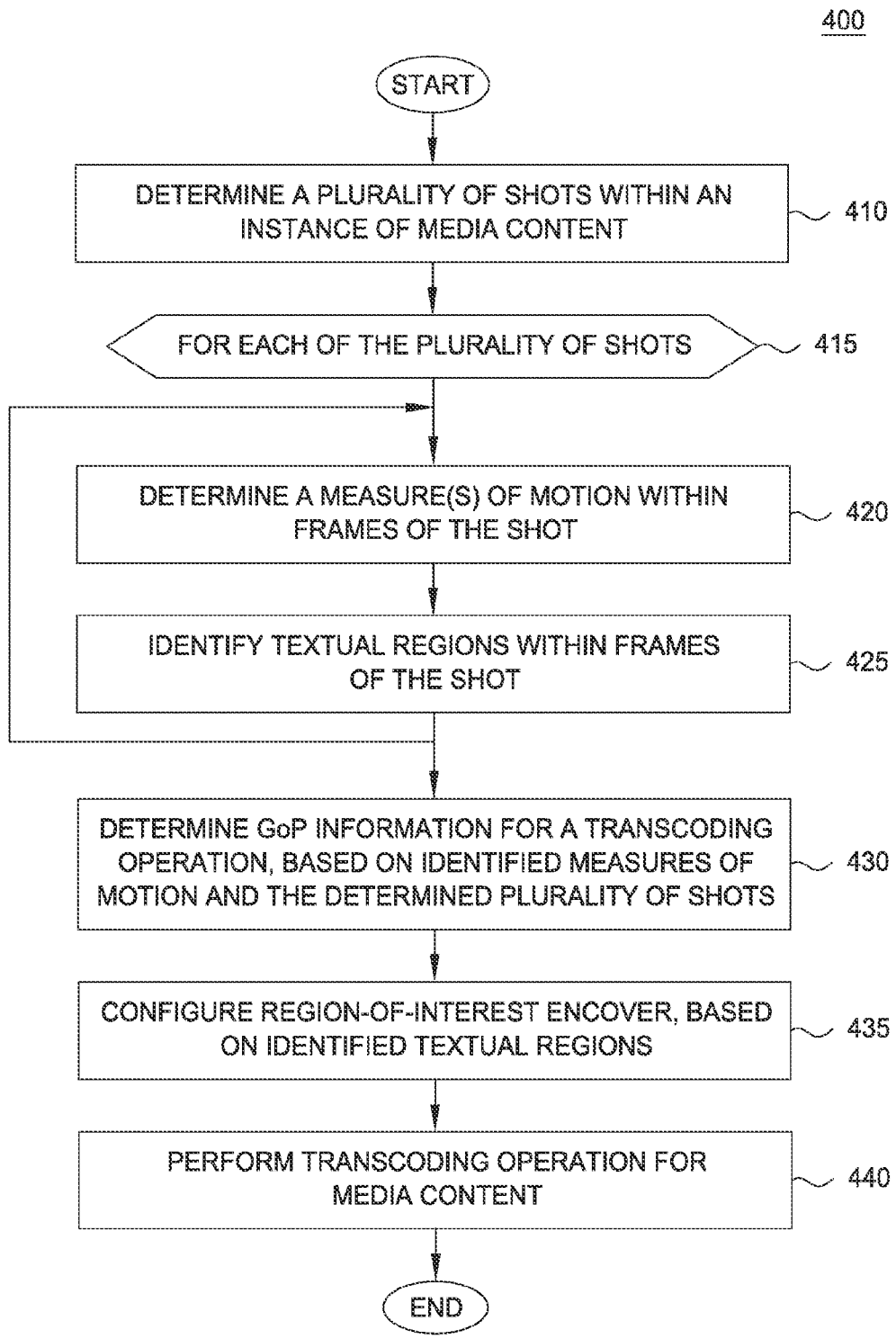
FIG. 4 is a flow diagram illustrating a method for performing metadata-based transcoding for an instance of video content containing textual regions, according to one embodiment described herein.

FIG. 4 is a flow diagram illustrating a method for performing metadata-based transcoding for an instance of video content containing textual regions, according to one embodiment described herein. As shown, the method 400 begins at block 410, where the metadata-based transcoding component 115 determines a plurality of shots within an instance of video content. The method 400 then enters a loop at block 415, where for each of the plurality of shots, the metadata-based transcoding component 115 determines a measure of motion within frames of the shot (block 420). Generally, any technique capable of estimating motion within frames of a video can be used.

Additionally, the metadata-based transcoding component 115 identifies textual regions within frames of the shot (block 425). For example, the metadata-based transcoding component 115 could use an OCR algorithm to identify any textual regions within the frames. Additionally, as discussed above, the metadata-based transcoding component 115 could perform one or more saliency algorithms to estimate regions-of-interest within frames of the video content. The depicted blocked 420 and 425 are repeated for each of the determined shots of the video content.

The metadata-based transcoding component 115 then determines GOP information for a transcoding schedule for use in encoding the video content, based on the identified shots and measures of motion within the shots (block 430). For instance, the GOP information could include GOP length information as well as GOP pattern information. Generally, the metadata-based transcoding component 115 can be configured to encode sequences of frames having a higher measure of motion using a shorter GOP length and/or a GOP pattern with more reference frames, and to encode sequences of frames having a lower measure of motion using a longer GOP length and/or a GOP pattern with fewer reference frames. Moreover, in areas of the video content that change frequently from one shot to the next, the metadata-based transcoding component 115 could use a shorter GOP length. Of course, such examples are provided for illustrative purposes and without limitation, and more generally, any GOP-related configuration parameter can be used in optimizing the transcoding of the video item.

Additionally, the metadata-based transcoding component 115 generates a transcoding schedule for the video item that includes configuration information for a region-of-interest encoder, based on the identified textual regions within the video item (block 435). For instance, the metadata-based transcoding component 115 could configure the region-of-interest encoder such that the textual regions within each of the frames are encoded at a higher level of quality than the remaining non-textual regions within the frames. Moreover, the metadata-based transcoding component 115 could further configure the region-of-interest encoder based on the determined salient regions within the frames of the video content, as detected using the saliency algorithm, such that more salient areas within the frames are encoded at a higher level of quality than the less salient regions.

The metadata-based transcoding component 115 then encodes the video content using the generated transcoding schedule (block 440) and the method 400 ends. By considering shots within the video content, textual areas within the video content as well as measures of motion across frames of the video content, the metadata-based transcoding component 115 can better optimize the encoding of the video content, thereby producing a higher quality video encoding in a more efficient manner. Moreover, by extracting the metadata describing the video content as part of the transcoding operation, the metadata-based transcoding component 115 can take advantage of computations made as part of the metadata extraction, thereby avoiding performing the duplicate operations seen in standalone metadata extraction and encoding operations.

Media Processing Node

Figure 5:
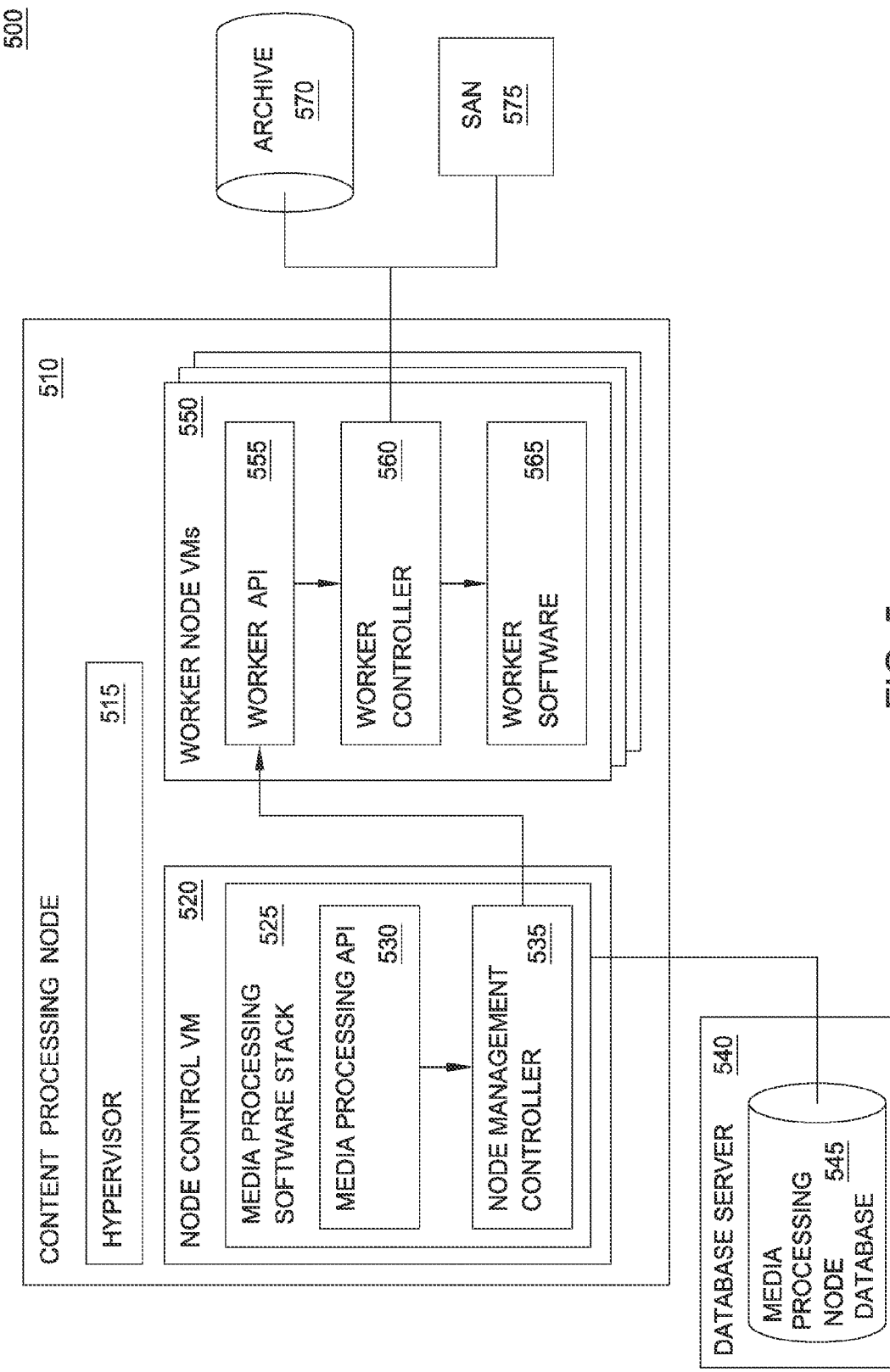
FIG. 5 is a block diagram illustrating a content processing system, according to one embodiment described herein.

In one aspect, a specialized media processing node can be provided for efficiently transcoding media files. Such transcoding can generally be performed using any suitable technique, including (without limitation) the aforementioned metadata-based transcoding techniques and traditional media transcoding techniques. An example of such a media processing node (also referred to herein as a content processing node) is shown in FIG. 5, which is a block diagram illustrating a content processing system, according to one embodiment described herein. As shown, the content processing node 510, a database server 540, a content archive 570 and a storage area network (SAN) 575. The content processing nod 510 includes a hypervisor 515, node control virtual machine (VM) 520, and worker node VMs 550. The database server 540 includes a media processing node database 545.

As shown, the node control VM 520 includes a media processing software stack 525, which includes a media processing application programming interface (API) 530 and a node management controller component 535. Additionally, each of the worker node VMs 550 includes a worker API, a worker controller component 560 and worker software 565. Of course, the depicted media transcoding system is provided for illustrative purposes only and without limitation.

Generally, the media processing API 530 can receive a request to perform a transcoding operation on a first instance of media content. For instance, the first instance of media content could be stored on a storage medium such as the storage archive 570 or on another device accessible via the SAN 575. The media processing API 530 could then transmit the received request to the node management controller 535 which could retrieve the first instance of media content. The node management controller 535 could then divide the transcoding operation into a plurality of sub-operations, each processing a respective portion of the first instance of media content. In doing so, the node management controller 535 can divide the first instance of media content into a corresponding number of portions. For example, the first instance of media content could be divided into portions based on identified scenes within the first instance of media content, where each portion corresponds to a single scene. In such an embodiment, particularly long scenes may be divided into multiple portions. In other embodiments, the node management controller 535 can divide the media content into fixed-length segments, a fixed number of segments, etc., and more generally any algorithm for dividing the media content into multiple portions can be used.

The node management controller 535 could also select one of a plurality of transcoding profiles for use in performing the transcoding operation. Generally, each transcoding profile relates to a respective transcoding operation and specifies configuration information for use in performing the transcoding operation. For instance, the node management controller 535 could select the transcoding operation based on the type of transcoding operation being performed. As an example, a first transcoding profile could relate to a particular encoding algorithm using less than a threshold level of sub-operations, a second transcoding profile could relate to the particular encoding algorithm using at least the threshold level of sub-operations and a third transcoding profile could relate to performing a different encoding algorithm using any number of sub-operations. Of course, these examples are provided for illustrative purposes only and are without limitation.

In one embodiment, the transcoding profiles are generated based on previous transcoding operations relating to the node management controller 535. For example, the node management controller 535 could have previously managed a specific type of transcoding operation and could have determined that a particular worker node VM configuration is optimal for the specific type of transcoding operation. The node management controller 535 could then modify a transcoding profile corresponding to the specific type of transcoding operation to specify that subsequent transcoding operations of the specific type should use the particular worker node VM configuration. Doing so allows the media processing node to improve its optimization and efficiency over time.

Upon selecting the transcoding profile, the node management controller 535 can configure the worker node VMs 550 to perform the plurality of sub-operations, based on configuration information specified within the selected transcoding profile. For example, the configuration information could specify optimal memory parameters for the worker node VMs 550, such as the total amount of memory to be allocated to the worker node VMs 550, a speed of memory to be allocated to the worker node VMs 550 and so on. As another example, the configuration information could specify optimal processor parameters for performing the transcoding operation on the first instance of media content, e.g., a number of processors to assign to each worker node VM 550, types of processors to be assigned to each worker node VM 550, a speed of the processors being assigned, and so on. In an embodiment where the workload of processing the first instance of media content is equally (or substantially equally) distributed across the worker node VMs 550, each of the worker node VMs 550 can be configured with the same (or substantially the same) configuration parameters. In some embodiments, the node management controller 535 can configure the worker node VMs 550 according to the processing demands of the sub-operation assigned to the respective worker node VM 550. In such an embodiment, a worker node VM 550 assigned a more computationally intensive sub-operation (e.g., a complex transcoding operation on a relatively lengthy portion of the first instance of media content) may be assigned more computer resources (e.g., processor, memory, etc.) than a worker node VM 550 that is assigned a less computationally intensive sub-operation.

In one embodiment, the node management controller 535 is configured to assign resources to the worker node VMs 550 based on available system resources (e.g., within a distributed computing environment, within a cloud computing environment, etc.). For example, upon determining that significant resources are available within a distributed computing environment, the node management controller 535 could assign relatively more computational resources to the worker node VMs 550 for use in performing the sub-operations in a more expedited fashion. Additionally, the number of worker node VMs 550 created can be dynamically determined based on available resources. For example, when relatively limited resources are currently available, the node management controller 535 could deploy a relatively lower number of worker node VMs 550 to ensure that each worker node VM 550 satisfies the recommended specifications in the transcoding profile. The node management controller 535 could also consider pricing information of the computing resources in addition to the availability of the resources. For example, the node management controller 535 could deploy a higher number of worker node VMs 550 during off-peak hours for a cloud computing environment when pricing of the computer resources is lower.

Additionally, the node management controller 535 can communicate with other node management controllers 535 on other media processing nodes to establish a second level of redundancy. For instance, if one of the worker node VMs 550 fails during the transcoding operation (or in the event the entire media processing node fails), then the other media processing nodes could take over the transcoding operation. For example, the node management controller 535 could distribute the transcoding operation(s) to the other node management controller 535, before beginning execution of the transcoding operation(s). The node management controller 535 could then notify the other node management controller 535 on the other media processing nodes in the event of a failure. For example, when a specific VM fails, the node management controller 535 could detect this and could notify the other node management controller 535. The other node management controller 535 could then initiate the transcoding operation that the failed VM was performing and could make the results of the transcoding operation available to the node management controller 535. Additionally, the node management controller 535 could be configured to periodically transmit status messages to the other node management controller 535, indicating that the node management controller's 535 media processing node is operating correctly. If the other node management controller 535 does not receive a status message within an expected window of time, the other node management controller 535 could determine that the node management controller 535 has failed and could take over the processing of the transcoding operation. Doing so provides a redundant backup for the media processing node and allows the transcoding operation to failover to another media processing node in the event a VM or the media processing node becomes unavailable.

Once the worker node VMs 550 are deployed, the node management controller 535 makes one or more calls to the worker API 555 within each worker node VM 550 to initiate the performance of the sub-operation(s) assigned to the worker node VM 550. Upon receiving the call(s), the worker APIs 555 transmit data indicative of the assigned sub-operation(s) to the worker controllers 560. Generally, the worker controllers 560 are software components configured to retrieve the first instance of media content (or the relevant portion of the first instance of media content) and to control the worker software 565 to perform the assigned sub-operation(s) on the retrieved media content. For example, the worker controllers 560 could retrieve the media content from the archive 570 or using the SAN 575. The worker software 565 generally represent software configured to perform a video encoding operation(s).

The worker controllers 560 then initiate the execution of the plurality of sub-operations using the worker software 565 on the configured plurality of virtual machine instances to produce a plurality of encoded fragments. In one embodiment, the worker software 565 is configured to perform a metadata-based transcoding operation, as discussed above. Generally, the instances of worker software 565 can output the encoded fragments of media content to storage media, such as the archive 570 or the SAN 575.

Once the sub-operations are complete, the node management controller 535 could combine the plurality of encoded fragments to produce an encoded instance of media content. In a particular embodiment, one or more of the worker controllers 560 can be configured to perform the combinatorial operation to produce the encoded instance of media content. In any event, doing so provides an optimized, distributed system for optimally transcoding video content.

The node management controller 535 may also monitor the execution of the plurality of sub-operations on the worker node VMs 550 and, based on the monitoring, the node management controller 535 can optimize the configuration of the worker node VMs 550 based on the configuration information specified within the selected transcoding profile. For example, if the node management controller 535 determines that a particular worker node VM 550 is struggling to complete its assigned sub-operation(s) and is falling behind the estimated schedule for completing the processing, the node management controller 535 could perform an optimization operation(s) to improve the performance of the struggling worker node VM 550. For instance, the node management controller 535 could divide the sub-operation(s) into multiple, smaller sub-operations and could assign at least one of the smaller sub-operations to another of the worker node VMs 550. As another example, upon determining that a particular worker node VM 550 is falling behind schedule, the node management controller 535 could allocate additional processing resources (e.g., CPUs, memory, etc.) to the worker node VM 550. In doing so, the node management controller 535 could allocate previously unassigned computing resources (e.g., by requesting additional resources within a cloud computing environment) or could reallocate resources assigned to another of the worker node VMs 550 to the struggling worker node VM 550. For example, if the node management controller 535 determines that a particular worker node VM 550 has finished performing its assigned sub-operations, the node management controller 535 could reallocate the resources from the finished worker node VM 550 to the struggling worker node VM 550, to help ensure that the struggling worker node VM 550 can complete its assigned sub-operation(s) more efficiently. Additionally, the node management controller 535 can store data describing the optimizations made to the worker node VMs 550, for use in optimizing further transcoding profiles. For instance, if the node management controller 535 determines that a particular VM configuration repeatedly requires additional computing resources to complete the assigned sub-operations without delay, the node management controller 535 could modify the transcoding profile accordingly, e.g., to assign additional resources to the VM in subsequent transcoding operations, to assign less computationally intensive sub-operations to the VM in subsequent transcoding operations by creating more total worker node VMs 550, etc.).

Figure 6:
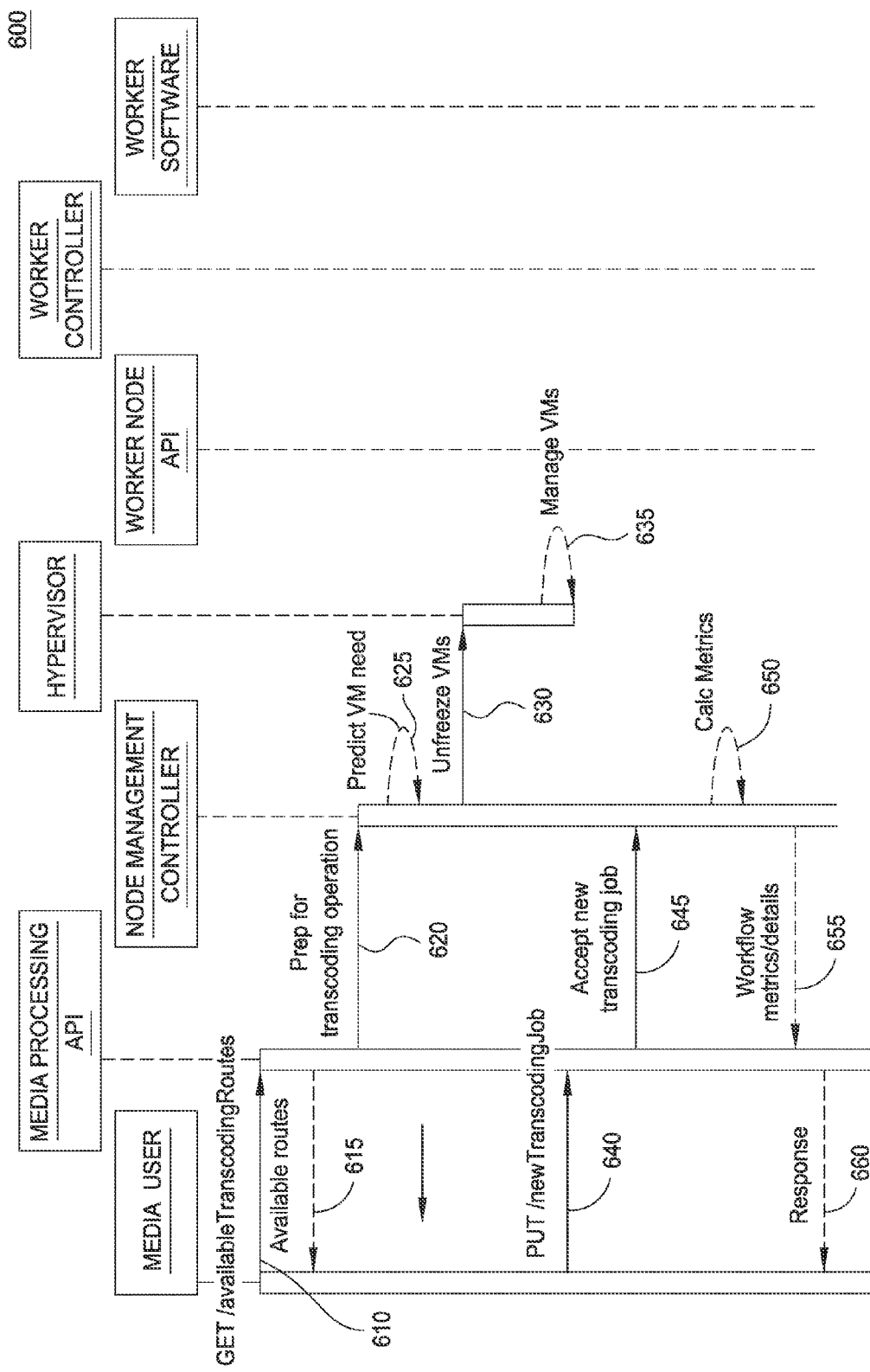
FIG. 6 is a flow diagram illustrating a method for deploying virtual machines for use in transcoding media content, according to one embodiment described herein.

FIG. 6 is a flow diagram illustrating a method for deploying virtual machines for use in transcoding media content, according to one embodiment described herein. As shown, the method 600 begins at block 610, where a user requests data specifying available transcoding operations that can be performed by a media processing node. The media processing API then outputs the requested data for display to the user (block 615). The media processing API receives information from the user indicating the type of transcoding operation to be performed and the node management controller 535 transmits data to prepare for performing the transcoding operation to the node management controller 535 (block 620).

The node management controller 535 then predicts the needs for worker node VMs 550 to perform the transcoding operation (block 625). In doing so, the node management controller 535 can select a transcoding profile based on the requested transcoding operation and can access VM configuration information within the selected profile to predict the optimal worker node VM 550 configuration. In the depicted embodiment, the node management controller 535 next unfreezes select worker node VMs 550 according to the determined VM needs (block 630). In some embodiment, the node management controller 535 may deploy new worker node VMs 550 according to the selected transcoding profile. Upon receiving the request to unfreeze (or deploy) the worker node VMs 550, the system hypervisor performs one or more VM management operations to ensure the requested VMs 550 are running and operational (block 635).

The user then inputs to the media processing API 530 the details of the transcoding operation to be performed (block 640). Such details may input, e.g., identifying information for the instance of media content to be transcoded, details of the transcoding operation to be performed such as the encoding format to be used, the encoding bitrate to be used, a total file size for the resulting transcoded media content, and so on. The media processing API 530 accepts the new transcoding job and forwards information describing the transcoding job to the node management controller 535 (block 645). The node management controller 535 calculates estimated processing metrics for performing the requested transcoding operation (block 650). Such metrics can include an estimated completion time for the transcoding operation. Additionally, the node management controller 535 could perform a final optimization of the transcoding schedule. For example, the node management controller 535 could determine that the instance of media content specified by the user is significantly larger in size than a typical instance of media content and thus could determine that a greater number of worker VMs should be used to process the media content.

The node management controller 535 returns the determined transcoding details and estimated metrics to the media processing API 530 (block 655), which in turn outputs the transcoding details and estimated metrics for display to the user (block 660) and the method 600 ends. Doing so provides an optimized technique for transcoding media content.

Figure 7:
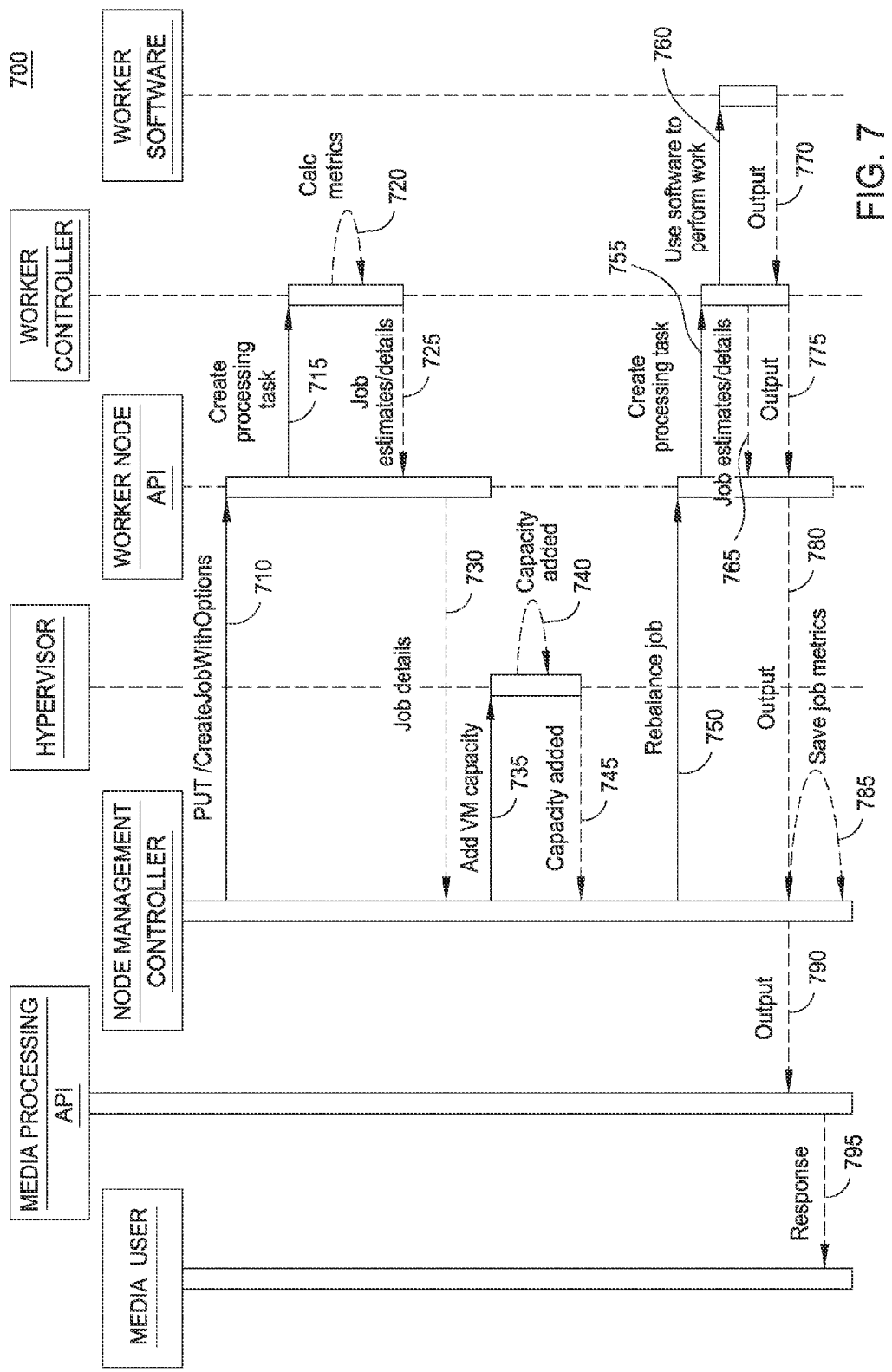
FIG. 7 is a flow diagram illustrating a method for transcoding media content using multiple virtual machines, according to one embodiment described herein.

FIG. 7 is a flow diagram illustrating a method for transcoding media content using multiple virtual machines, according to one embodiment described herein. As shown, the method 700 begins at block 710, where the node management controller 535 transmit a call to the worker node APIs on the deployed worker node VMs in order to initiate the execution of the transcoding sub-operation(s) assigned to each worker node VM. The worker node APIs in turn transmit a message to the worker controllers on the worker node VMs, instructing the worker controllers to create a processing task to perform the assigned sub-operation (block 715). Upon receiving the message, the worker controllers calculate metrics for performing the assigned sub-operation (block 720). Such metrics could include, for instance, an estimated completion time for the respective worker node VM to finish completing the assigned transcoding sub-operation. The worker controllers return the job estimates and details information to the worker node API (block 725), which in turn relays the information to the node management controller 535 (block 730).

In the depicted embodiment, the node management controller 535 analyzes the received job estimate and details information and determines that at least one of the worker node VMs will not complete its assigned sub-operation on schedule. For example, the node management controller 535 could determine an acceptable range of time for the completion of each of the sub-operations assigned to the worker node VMs, and the node management controller 535 could determine that a particular worker node VM will not complete its assigned sub-operation on schedule when the returned job estimate information indicates a completion time outside of the acceptable range of time.

As such, the node management controller 535 instructs the hypervisor to add additional worker node VM capacity (block 735) and, in response, the hypervisor adds the requested VM capacity (block 740). Upon adding the requested VM capacity, the hypervisor returns a confirmation that the VM capacity was added successfully to the node management controller 535 (block 745). As discussed above, such capacity could be in the form of assigning additional processing resources to an existing worker node VM. In the depicted embodiment, the added capacity is in the form of additional worker node VM instances. In such an embodiment, the node management controller 535 divides one or more of the sub-operations into multiple sub-operations and could redistribute the sub-operations across the worker node VMs so that the workload is substantially evenly distributed across the worker node VMs (block 750)

The worker node APIs again create processing tasks for the worker controllers to perform (block 755). At this point, the worker controllers recalculate the job estimate and details information for completing the assigned tasks and return this information to the worker node API (block 765). Although not shown, blocks 730 through 750 could be repeated at this point, if the node management controller 535 determines that the recalculated job estimate and details information still indicates that one or more worker node VMs will not complete the assigned task on schedule.

In any event, in the depicted embodiment, the node management controller 535 has determined that the returned job estimates information indicates that the worker node VMs will complete the assigned tasks on schedule. As such, the worker controllers instruct the worker software to perform the assigned tasks (block 760). In doing so, the worker controllers may optimize the transcoding operation performed by the worker software according to the transcoding schedule. Moreover, in particular embodiments, the worker controllers may instruct the worker software to perform a metadata-based transcoding operation, as discussed above (e.g., using the methods 300 and 400 shown in the FIGS. 3 and 4).

Once the worker software completes the transcoding operation, the worker software transmits the output encoded video information (or information identifying a storage location of the output encoded video information) to the worker controller (block 770), and this information is relayed in turn to the worker node API (block 775), the node management controller 535 (block 780), and the media processing API (block 790). The media processing API outputs a response, indicating to the user that the transcoding operation has been completed (block 795). Additionally, the node management controller 535 can perform one or more processing operations to stitch the encoded fragments of media content into a single instance of encoded video content. That is, each of the worker node VMs is generally assigned to process only a portion of the media content and thus the output produced by each worker node VM represents only a portion of the resulting encoded media content. As such, the node management controller 535 can be configured to stitch the encoded fragments together in proper order to produce the encoded media content. In the depicted embodiment, the node management controller 535 also saves metrics related to the transcoding job for use in optimizing subsequent transcoding operations (block 785).

Figure 8:
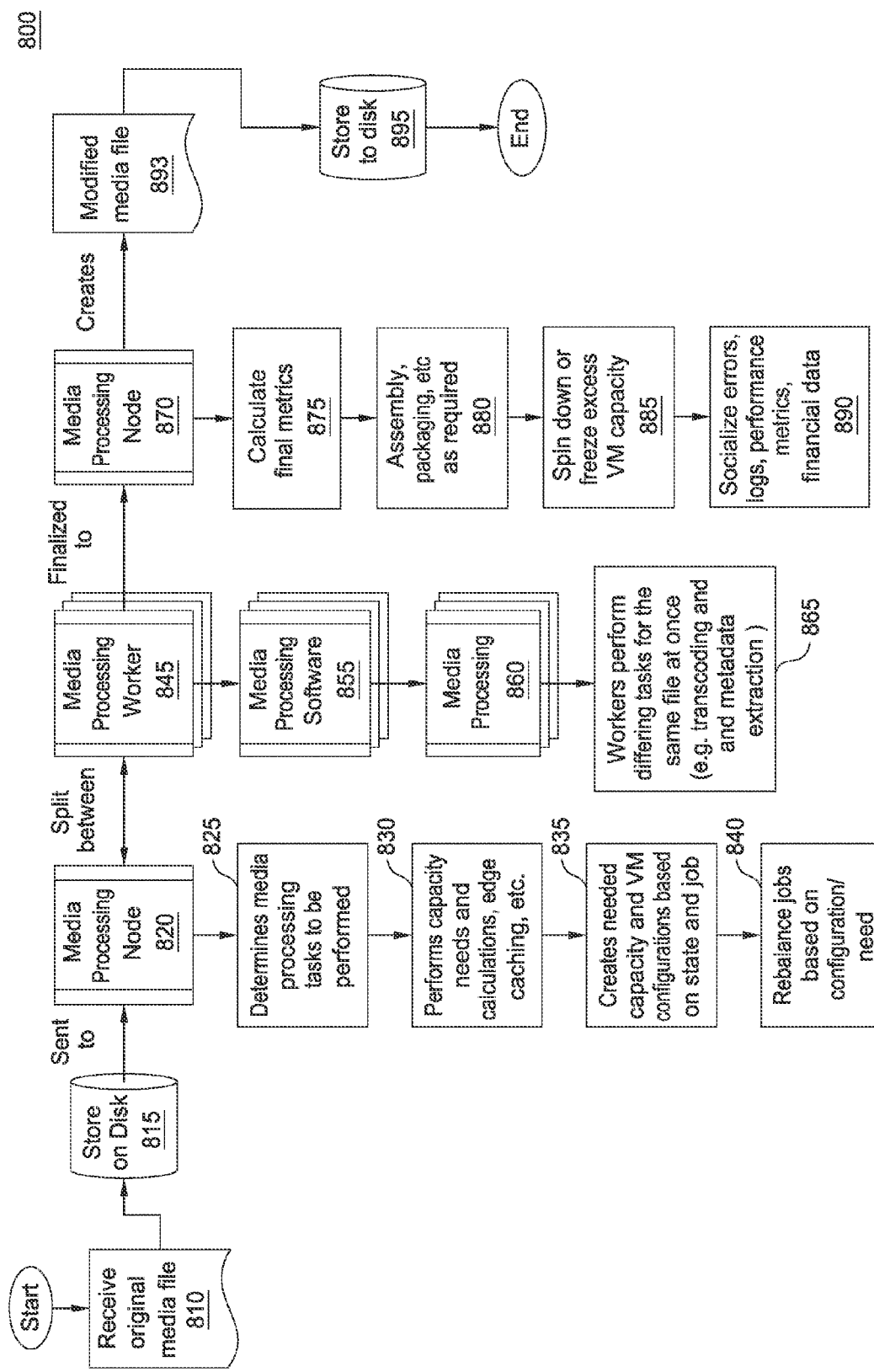
FIG. 8 illustrates a workflow for transcoding media content using a content processing node, according to one embodiment described herein.

FIG. 8 illustrates a workflow for transcoding media content using a content processing node, according to one embodiment described herein. As shown, the method 800 begins at block 810, where the original media file is received, and stored disk for subsequent processing (block 815). Generally, the media file can be received and stored using any number of suitable techniques (e.g., via a front-end API, manually by the user, and so on). A request for transcoding the media file is then sent to the media processing node (block 820). Upon receiving the request, the media processing node determines one or more media processing tasks to be performed on the media file, based on the request (block 825). For example, the media processing tasks could include a media transcoding operation for encoding the media file into a particular encoding format. As another example, the media processing tasks could also include metadata extraction operations to be performed on the media file for use in optimizing the media transcoding operation.

The media processing node further performs a capacity needs estimation as well as an edge caching operation (block 830). For example, the node management controller on the media processing node could select a transcoding profile for performing the transcoding operation. As an example, such a transcoding profile could describe one or more edge caching operations to be performed in order to optimize the transcoding process. For example, such an edge caching operation could include predictively moving data related to the transcoding operation to local memory of the media processing node, prior to when the data is needed as part of the transcoding operation. Doing so enables the data to be quickly accessed from local memory as needed during the transcoding operation. For instance, the media processing node could migrate one or more virtual machine images to a data center where the media data is located, prior to the transcoding operation being performed, so that virtual machine instances can be quickly created using the virtual machine images for use in performing the transcoding operation. By caching data relating to the transcoding operation prior to performing the transcoding operation, the media processing node can optimize the performance of the transcoding operation.

The media processing node then creates the needed worker node VMs based on the selected profile and the received request (block 835). In doing so, the media processing node can also divide the media file into a number of different portions, where each portion is to be processed by a respective sub-operation on a respective worker node VM. These portions and the corresponding encoding tasks are split between the worker node VMs, shown in block 845. Additionally, the media processing node performs one or more rebalancing operations to ensure an optimal distribution of the sub-operations across the worker node VMs (block 840). Generally, any load balancing methodology suitable for distributing jobs across the worker node VMs can be used, consistent with the present disclosure.

Once the encoding tasks are distributed across the worker node VMs, control logic (e.g., worker controller 560) on the worker node VMs configures media processing software (e.g., worker software 565) on the worker node VMs to perform the assigned encoding tasks (block 855). The control logic then instructs the media processing software to perform the assigned media processing tasks (block 860) and the media processing software begins performing the tasks for various portions of the same instance of media content in parallel (block 865). For example, as discussed above, the media processing software can perform a single processing operation that includes both metadata extraction operations and media encoding operations.

Once the worker node VMs complete their assigned encoding operations, logic on the media processing node finalizes the encoding of the media file (block 870). In doing so, the logic calculates final metrics for the encoded media file (block 875) and performs any required assembly and packaging of the encoded portions of the media file (block 880). That is, as each of the worker node VMs processed a respective portion of the original media file, the resulting encoded portions may need to be reassembled to produce a single encoded media file. By doing so, the node management controller 535 creates the encoded media file (block 893). Generally, the final metrics calculated can include, without limitation, how long the transcoding operation took to complete (i.e., the duration), processing benchmarks during the transcoding operation (e.g., CPU performance for the particular transcoding profile), and so on. The node management controller 535 can generally use the final metrics into future optimization operations, such that future transcoding jobs can utilize the best performing node/processors for a given task. The node management controller 535 then stores the created file (block 895) and the method 800 ends.

Additionally, the node management controller 535 removes (e.g., spins down, freezes, etc.) any unneeded VM capacity from the worker node VMs (block 885). For example, if the node management controller 535 determines that no additional transcoding operations are queued up, the node management controller 535 may suspend the worker node VMs until another transcoding operation is requested. On the other hand, if an additional transcoding operation is queued up for processing, the node management controller 535 may use any (or all) of the worker node VMs for processing the next transcoding operation. The node management controller 535 also stores data describing the completed transcoding operation (block 890). Such data can include, for example, error messages, logs, performance metrics, financial data and so on relating to the transcoding operation. This data can be used, for example, in optimizing subsequent transcoding operations.

Figure 9:
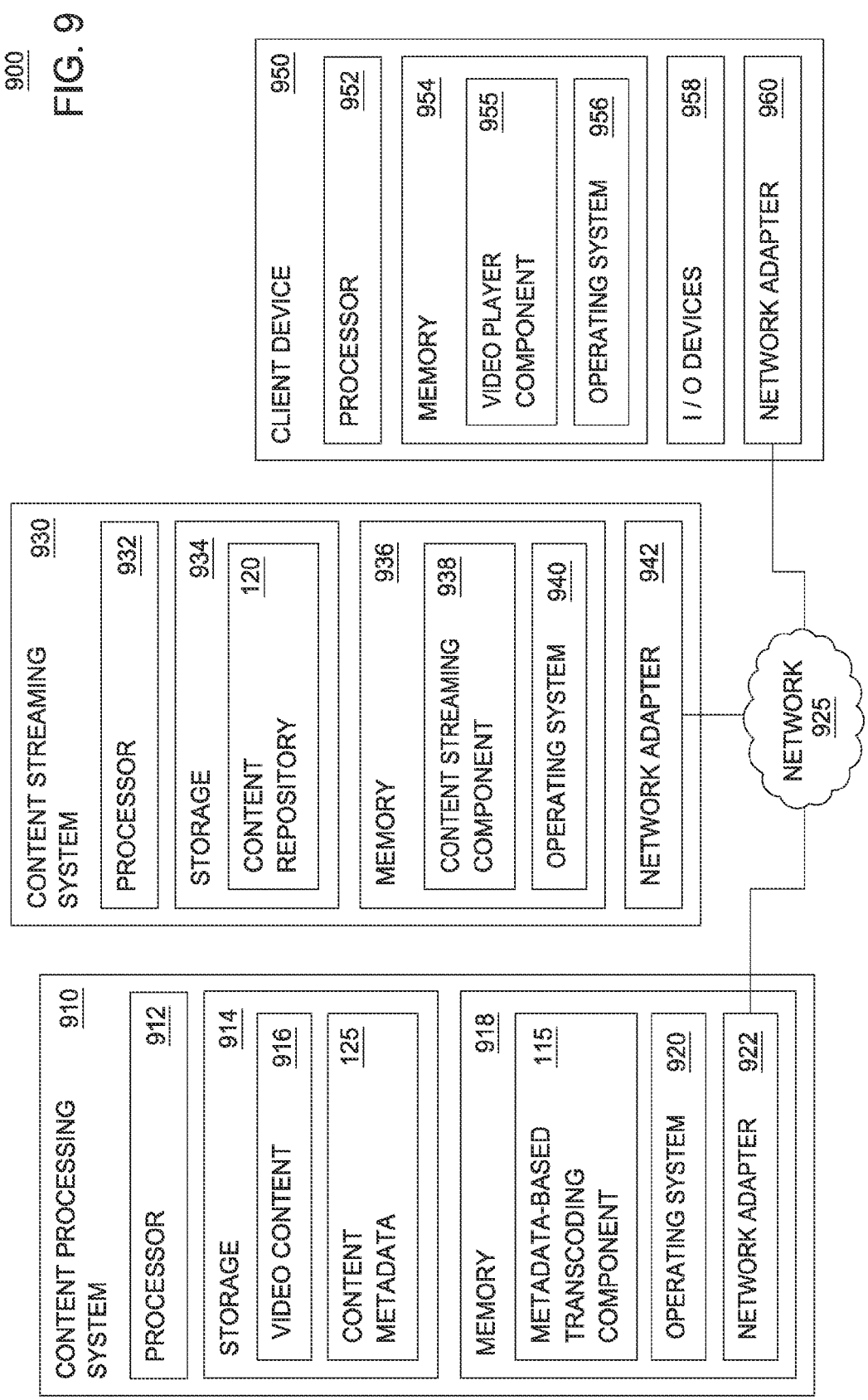
FIG. 9 is a block diagram illustrating a system for transcoding video content and delivering the video content to end-user client devices, according to one embodiment described herein.

FIG. 9 is a block diagram illustrating a system for transcoding video content and delivering the video content to end-user client devices, according to one embodiment described herein. As shown, the system 900 includes a content processing system 910, a content streaming system 930 and a client device 950, interconnected via a network 925. Generally, the network 925 represents any data communication network capable of connecting the systems 910, 930 and 950. For example, the network 925 could be a TCP/IP network, e.g., the Internet.

The content processing system 910 includes a processor 912, storage 914, memory 918, and a network adapter 922. Generally, the processor 910 retrieves and executes programming instructions stored in the memory 918. Processor 912 is included to be representative of a single CPU, multiple CPUs, a single CPU having multiple processing cores, GPUs having multiple execution paths, and the like. The memory 918 is generally included to be representative of a random access memory. Further, while the depicted embodiment illustrates the components of a particular content processing system 910, one of ordinary skill in the art will recognize that interactive objects may use a variety of different hardware architectures. Moreover, it is explicitly contemplated that embodiments may be implemented using any device or computer system capable of performing the functions described herein.

The memory 918 represents any memory sufficiently large to hold the necessary programs and data structures. Memory 918 could be one or a combination of memory devices, including Random Access Memory, nonvolatile or backup memory (e.g., programmable or Flash memories, read-only memories, etc.). In addition, memory 918 and storage 914 may be considered to include memory physically located elsewhere; for example, on another computer communicatively coupled to the system 910. Illustratively, the memory 918 includes a metadata-based transcoding component 115 and an operating system 920. The operating system 920 generally controls the execution of application programs on the system 910. Examples of operating system 920 include UNIX, a version of the Microsoft Windows® operating system, and distributions of the Linux® operating system.

As shown, storage 914 contains video content 916. Generally, as discussed above, the metadata-based transcoding component 115 could analyze the video content 916 to determine a plurality of shots within the instance of video content. The metadata-based transcoding component 115 could also analyze the instance of video content to generate metadata describing the media content, where the generated metadata includes, for each of the plurality of shots, data describing a plurality of frames within the respective shot. Additionally, the metadata-based transcoding component 115 could generate an optimized transcoding schedule for transcoding the instance of video content from a first video encoding format to a second video encoding format, based on the generated metadata. Once the transcoding schedule is generated, the metadata-based transcoding component 115 encodes the instance of video content according to the optimized transcoding schedule.

The content streaming system 930 includes processor 932, storage 934, memory 938 and network adapter 942. Generally, the processor 932 retrieves and executes programming instructions stored in the memory 938. Processor 932 is included to be representative of a single CPU, multiple CPUs, a single CPU having multiple processing cores, GPUs having multiple execution paths, and the like. The memory 938 is generally included to be representative of a random access memory. Further, while the depicted embodiment illustrates the components of a particular content streaming system 930, one of ordinary skill in the art will recognize that interactive objects may use a variety of different hardware architectures. Moreover, it is explicitly contemplated that embodiments may be implemented using any device or computer system capable of performing the functions described herein.

The memory 938 represents any memory sufficiently large to hold the necessary programs and data structures. Memory 938 could be one or a combination of memory devices, including Random Access Memory, nonvolatile or backup memory (e.g., programmable or Flash memories, read-only memories, etc.). In addition, memory 938 and storage 934 may be considered to include memory physically located elsewhere; for example, on another computer communicatively coupled to the system 930. Illustratively, the memory 938 includes a content streaming component 938 and an operating system 940. The operating system 940 generally controls the execution of application programs on the system 930. Examples of operating system 940 include UNIX, a version of the Microsoft Windows® operating system, and distributions of the Linux® operating system.

As shown, storage 934 contains a content repository 120. Generally, the content repository 120 represents the media items managed by the content streaming system 930 and which may be streamed by the content streaming component 938 to, e.g., the client device 950. The client device 950 includes processor 952, memory 954, I/O devices 958 and network adapter 960. Generally, the processor 952 retrieves and executes programming instructions stored in the memory 954. Processor 952 is included to be representative of a single CPU, multiple CPUs, a single CPU having multiple processing cores, GPUs having multiple execution paths, and the like. The memory 954 is generally included to be representative of a random access memory. Further, while the depicted embodiment illustrates the components of a particular client device 950, one of ordinary skill in the art will recognize that interactive objects may use a variety of different hardware architectures. Moreover, it is explicitly contemplated that embodiments may be implemented using any device or computer system capable of performing the functions described herein.

The memory 954 represents any memory sufficiently large to hold the necessary programs and data structures. Memory 954 could be one or a combination of memory devices, including Random Access Memory, nonvolatile or backup memory (e.g., programmable or Flash memories, read-only memories, etc.). In addition, memory 954 may be considered to include memory physically located elsewhere; for example, on another computer communicatively coupled to the client device 950. Illustratively, the memory 954 includes a video player component 955 and an operating system 956. The operating system 956 generally controls the execution of application programs on the client device 950. Examples of operating system 956 include UNIX, a version of the Microsoft Windows® operating system, and distributions of the Linux® operating system. Additional examples of operating system 956 include custom operating systems for gaming consoles, including the custom operating systems for systems such as the Nintendo DS® and Sony PSP®.

Generally, the video player component 145 is configured to playback video content on the client device 950, e.g., for output using a display device of I/O devices 958. Additionally, the video player component 145 could detect a watermark embedded within the video content being played back and could determine a timestamp associated with the watermark (e.g., the timestamp corresponding to the position at which the watermark is embedded within an audio stream of the video content). The video player component 145 could then transmit the timestamp to a content server, such as the content processing system 910. Upon receiving the timestamp information, the video processing component 115 could look-up a known content entity corresponding to the timestamp information and could query the content selection component 125 specifying an identifier for the known content entity to retrieve supplemental content for the content entity. The video processing component 115 could then return the supplemental content to the video player component 145 and the video player component 145 could output at least an indication of the supplemental content. For example, the video player component 145 could display an indication of the supplemental content adjacent to the playback of the video data.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, metadata-based transcoding component 115 could execute on a computing system in the cloud and could process video content to determine a plurality of shots within the video content. The metadata-based transcoding component 115 could then extract metadata describing the video content and each of the plurality of shots and could generate an optimized transcoding schedule based on the extracted metadata. The video content could then be encoded according to the optimized transcoding schedule. Doing so allows client devices to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a request to perform a transcoding operation on a first instance of media content;
   dividing, by operation of one or more computer processors, the transcoding operation into a plurality of sub-operations, each of the sub-operations processing a respective portion of the first instance of media content;

selecting one of a plurality of transcoding profiles for use in performing the transcoding operation, wherein each of the plurality of transcoding profiles relates to a respective transcoding operation and specifies configuration information for performing the respective transcoding operation;

configuring a plurality of virtual machine instances to perform the plurality of sub-operations, based on configuration information specified within the selected transcoding profile, comprising:

dynamically determining the number of the plurality of virtual machine instances based on the selected transcoding profile and available system resources;

allocating an respective amount of the available system resources to each of the plurality of virtual machine instances, based on the selected transcoding profile and the corresponding sub-operation performed by the virtual machine instance; and deploying each of the plurality of virtual machine instances with the respective amount of system resources;

initiating an execution of the plurality of sub-operations using the configured plurality of virtual machine instances to produce a plurality of encoded fragments of the first instance of media content; and combining, by operation of the one or more computer processors, the plurality of encoded fragments to produce an encoded instance of the first instance of media content.

2. The method of claim 1, further comprising:
monitoring the execution of the plurality of sub-operations on the plurality of virtual machine instances; and
based on the monitoring, optimizing a configuration of one of the plurality of virtual machine instances based on the configuration information specified within the selected transcoding profile.

3. The method of claim 2, wherein optimizing a configuration of one of the plurality of virtual machine instances based on the configuration information specified within the selected transcoding profile further comprises:
splitting one of the plurality of sub-operations into two or more sub-operations; and
allocating the two or more sub-operations across two or more of the plurality of virtual machine instances, based on a load balancing algorithm.

4. The method of claim 2, wherein optimizing a configuration of one of the plurality of virtual machine instances based on the configuration information specified within the selected transcoding profile further comprises:
moving the execution of one of the plurality of sub-operations from a first virtual machine instance of the plurality of virtual machine instances to a second virtual machine instance of the plurality of virtual machine instances.

5. The method of claim 2, further comprising:
storing configuration data describing the optimized configuration of the virtual machine instance, for use in optimizing subsequent transcoding operations.

6. The method of claim 1, further comprising:
generating an optimized transcoding schedule for transcoding the first instance of media content, from a first video encoding format to a second video encoding format, based on generated metadata describing the first instance of media content,
wherein initiating an execution of the plurality of sub-operations using the configured plurality of virtual machine instances to produce a plurality of encoded fragments is performed according to the optimized transcoding schedule.

7. The method of claim 6, wherein generating an optimized transcoding schedule for transcoding the first instance of media content, from a first video encoding format to a second video encoding format, based on generated metadata describing the first instance of media content, further comprises:
determining a plurality of shots within the first instance of media content; and
analyzing the first instance of media content to generate metadata describing the media content, wherein the generated metadata includes, for each of the plurality of shots, data describing a plurality of frames within the respective shot.

8. The method of claim 7, wherein analyzing the instance of video content further comprises:
determining, for each of the plurality of shots, a measure of motion within the plurality of frames within the respective shot, and
wherein the generated metadata includes the determined measure of motion for each of the plurality of frames.

9. A non-transitory computer-readable medium containing computer program code that, when executed, performs an operation comprising:
receiving a request to perform a transcoding operation on a first instance of media content;
dividing the transcoding operation into a plurality of sub-operations, each of the sub-operations processing a respective portion of the first instance of media content;
selecting one of a plurality of transcoding profiles for use in performing the transcoding operation, wherein each of the plurality of transcoding profiles relates to a respective transcoding operation and specifies configuration information for performing the respective transcoding operation;
configuring a plurality of virtual machine instances to perform the plurality of sub-operations, based on configuration information specified within the selected transcoding profile, comprising:
dynamically determining the number of the plurality of virtual machine instances based on the selected transcoding profile and available system resources;
allocating an respective amount of the available system resources to each of the plurality of virtual machine instances, based on the selected transcoding profile and the corresponding sub-operation performed by the virtual machine instance; and
deploying each of the plurality of virtual machine instances with the respective amount of system resources;
initiating an execution of the plurality of sub-operations using the configured plurality of virtual machine instances to produce a plurality of encoded fragments of the first instance of media content; and
combining the plurality of encoded fragments to produce an encoded instance of the first instance of media content.

10. The non-transitory computer-readable medium of claim 9, the operation further comprising:
monitoring the execution of the plurality of sub-operations on the plurality of virtual machine instances; and
based on the monitoring, optimizing a configuration of one of the plurality of virtual machine instances based on the configuration information specified within the selected transcoding profile.

11. The non-transitory computer-readable medium of claim 10, wherein optimizing a configuration of one of the plurality of virtual machine instances based on the configuration information specified within the selected transcoding profile further comprises:
  splitting one of the plurality of sub-operations into two or more sub-operations; and
  allocating the two or more sub-operations across two or more of the plurality of virtual machine instances, based on a load balancing algorithm.

12. The non-transitory computer-readable medium of claim 10, wherein optimizing a configuration of one of the plurality of virtual machine instances based on the configuration information specified within the selected transcoding profile further comprises:
  moving the execution of one of the plurality of sub-operations from a first virtual machine instance of the plurality of virtual machine instances to a second virtual machine instance of the plurality of virtual machine instances.

13. The non-transitory computer-readable medium of claim 10, the operation further comprising:
  storing configuration data describing the optimized configuration of the virtual machine instance, for use in optimizing subsequent transcoding operations.

14. The non-transitory computer-readable medium of claim 9, the operation further comprising:
  generating an optimized transcoding schedule for transcoding the first instance of media content, from a first video encoding format to a second video encoding format, based on generated metadata describing the first instance of media content,
  wherein initiating an execution of the plurality of sub-operations using the configured plurality of virtual machine instances to produce a plurality of encoded fragments is performed according to the optimized transcoding schedule.

15. The non-transitory computer-readable medium of claim 14, wherein generating an optimized transcoding schedule for transcoding the first instance of media content, from a first video encoding format to a second video encoding format, based on generated metadata describing the first instance of media content, further comprises:
  determining a plurality of shots within the first instance of media content; and
  analyzing the first instance of media content to generate metadata describing the media content, wherein the generated metadata includes, for each of the plurality of shots, data describing a plurality of frames within the respective shot.

16. The non-transitory computer-readable medium of claim 15, wherein analyzing the instance of video content further comprises:
  determining, for each of the plurality of shots, a measure of motion within the plurality of frames within the respective shot, and
  wherein the generated metadata includes the determined measure of motion for each of the plurality of frames.

17. A system, comprising:
a processor; and
a memory containing a program that, when executed by operation of the processor, performs an operation comprising:
  receiving a request to perform a transcoding operation on a first instance of media content;
  dividing the transcoding operation into a plurality of sub-operations, each of the sub-operations processing a respective portion of the first instance of media content;
  selecting one of a plurality of transcoding profiles for use in performing the transcoding operation, wherein each of the plurality of transcoding profiles relates to a respective transcoding operation and specifies configuration information for performing the respective transcoding operation;
  configuring a plurality of virtual machine instances to perform the plurality of sub-operations, based on configuration information specified within the selected transcoding profile, comprising:
    dynamically determining the number of the plurality of virtual machine instances based on the selected transcoding profile and available system resources;
    allocating an respective amount of the available system resources to each of the plurality of virtual machine instances, based on the selected transcoding profile and the corresponding sub-operation performed by the virtual machine instance; and
    deploying each of the plurality of virtual machine instances with the respective amount of system resources;
  initiating an execution of the plurality of sub-operations using the configured plurality of virtual machine instances to produce a plurality of encoded fragments of the first instance of media content; and
  combining the plurality of encoded fragments to produce an encoded instance of the first instance of media content.

18. The system of claim 17, the operation further comprising:
  monitoring the execution of the plurality of sub-operations on the plurality of virtual machine instances; and
  based on the monitoring, optimizing a configuration of one of the plurality of virtual machine instances based on the configuration information specified within the selected transcoding profile.

* * * * *